UNITED STATES PATENT OFFICE.

MARINO BATTAGLIA, OF BOSTON, MASSACHUSETTS.

IMPROVEMENT IN REMEDIES FOR COUGHS, COLDS, &c.

Specification forming part of Letters Patent No. 177,614, dated May 23, 1876; application filed March 7, 1876.

*To all whom it may concern:*

Be it known that I, MARINO BATTAGLIA, of Boston, in the county of Suffolk and State of Massachusetts, have invented a Compound for Cough Medicine; and I hereby declare the following to be a full, clear, and exact description of the same.

My invention has for its object to effect a rapid cure for coughs, colds, catarrh, sore throat, and kindred complaints, and consists in a compound formed of St. John's bread, (*Ceratonia siliqua*,) brown sugar, dried figs, licorice-root, elder-flowers, and water.

To enable others skilled in the art to understand and use my invention, I will proceed to describe the manner in which I have carried it out.

I take one pound (1 lb.) of St. John's bread, (*Ceratonia siliqua*,) one pound (1 lb.) of brown sugar, one pound (1 lb.) of dried figs, two ounces (2 oz.) of licorice-root, one ounce (1 oz.) of elder-flowers, and place them in a suitable vessel, with one gallon (1 gal.) of water. I then boil down this mixture till it is reduced to one quart, (1 qt.,) after which it is strained and allowed to cool, when it is bottled for use.

One (1) table-spoonful of the above-described mixture should be taken three times a day; but the dose may be varied according to circumstances.

The proportions of the ingredients named may be somewhat varied without departing from the spirit of my invention.

What I claim as my invention, and desire to secure by Letters Patent, is—

A cough compound formed of St. John's bread, (*Ceratonia siliqua*,) brown sugar, dried figs, licorice-root, elder-flowers, and water, substantially as described.

Witness my hand this 4th day of March, A. D. 1876.

MARINO BATTAGLIA.

In presence of—
P. E. TESCHEMACHER,
W. J. CAMBRIDGE.